(12) United States Patent
Pound et al.

(10) Patent No.: US 10,515,476 B2
(45) Date of Patent: Dec. 24, 2019

(54) IMAGE FETCHING FOR TIMELINE SCRUBBING OF DIGITAL MEDIA

(71) Applicant: Apple Inc., Cupertino, CA (US)

(72) Inventors: David Alan Pound, San Jose, CA (US); Roger N. Pantos, Scotts Valley, CA (US); Christopher L. Oklota, San Francisco, CA (US); David L. Biderman, San Jose, CA (US); John Y. Su, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/947,724

(22) Filed: Apr. 6, 2018

(65) Prior Publication Data

US 2019/0080502 A1    Mar. 14, 2019

Related U.S. Application Data

(62) Division of application No. 14/743,955, filed on Jun. 18, 2015, now Pat. No. 9,940,746.

(51) Int. Cl.
*G06T 13/80* (2011.01)
*G06T 17/00* (2006.01)
(Continued)

(52) U.S. Cl.
CPC .............. *G06T 13/80* (2013.01); *G06T 7/564* (2017.01); *G06T 17/00* (2013.01); *G11B 27/102* (2013.01);
(Continued)

(58) Field of Classification Search
CPC ..... G11B 27/34; G11B 27/034; G11B 27/105; G11B 27/031; G11B 27/00; G11B 27/102; G06F 17/30852; G06F 17/30994; G06T 13/80; G06T 13/00; G06T 13/20; G06T 2200/24; G06T 7/00; H04N 21/47211; H04N 21/845
See application file for complete search history.

(56) References Cited

U.S. PATENT DOCUMENTS 6,070,228 A    5/2000  Belknap et al.
6,400,378 B1   6/2002  Snook
(Continued)

FOREIGN PATENT DOCUMENTS

EP    1806920    7/2007

*Primary Examiner* — Jingge Wu
(74) *Attorney, Agent, or Firm* — Fish & Richardson P.C.

(57) ABSTRACT

Disclosed are systems, methods, devices and computer-readable media for image fetching for timeline scrubbing of digital media. In some implementations, a method comprises: receiving at a first time prior to receiving a scrub command, a first set of scrub images associated with digital media, the first set of scrub images having a first set of positions on a timeline of the digital media; receiving a first scrub command; receiving at a second time after the first time, a second set of scrub images associated with the digital media, the second set of scrub images having a second set of positions on the timeline that fill time gaps in the first set of positions on the timeline; animating, a timeline overlay including the timeline, a playhead and a scrub image window; and selecting a scrub image from the first or second sets of scrub images for presentation in the scrub image window.

10 Claims, 8 Drawing Sheets

(51) Int. Cl.
*G11B 27/10* (2006.01)
*G11B 27/34* (2006.01)
*G06T 7/564* (2017.01)
*G11B 27/30* (2006.01)
*H04N 21/431* (2011.01)
*H04N 21/472* (2011.01)
*H04N 21/482* (2011.01)

(52) U.S. Cl.
CPC ........ *G11B 27/105* (2013.01); *G11B 27/3081* (2013.01); *G11B 27/34* (2013.01); *H04N 21/4316* (2013.01); *H04N 21/47217* (2013.01); *H04N 21/4825* (2013.01); *G06T 2200/08* (2013.01); *G06T 2207/10028* (2013.01)

(56) References Cited

U.S. PATENT DOCUMENTS

| | | | |
|---|---|---|---|
| 7,565,524 | B2 | 7/2009 | Levy |
| 8,839,306 | B2 | 9/2014 | Roberts et al. |
| 2001/0001616 | A1* | 5/2001 | Rakib ................ H03M 13/256 375/259 |
| 2002/0075572 | A1 | 6/2002 | Boreczky et al. |
| 2003/0093790 | A1 | 5/2003 | Logan et al. |
| 2004/0027369 | A1 | 2/2004 | Kellock et al. |
| 2004/0061794 | A1 | 4/2004 | Bodin |
| 2004/0093360 | A1 | 5/2004 | Hudson |
| 2004/0141723 | A1 | 7/2004 | Sakano |
| 2004/0205286 | A1 | 10/2004 | Bryant et al. |
| 2005/0114116 | A1 | 5/2005 | Fiedler |
| 2005/0179692 | A1 | 8/2005 | Kumagai et al. |
| 2005/0216839 | A1 | 9/2005 | Salyucci et al. |
| 2006/0150072 | A1 | 7/2006 | Salvucci |
| 2006/0218365 | A1 | 9/2006 | Osaki et al. |
| 2006/0224940 | A1 | 10/2006 | Lee et al. |
| 2006/0226232 | A1 | 10/2006 | Helkio et al. |
| 2006/0279628 | A1 | 12/2006 | Fleming et al. |
| 2007/0016611 | A1 | 1/2007 | Wang |
| 2007/0050379 | A1 | 3/2007 | Day et al. |
| 2008/0192129 | A1 | 8/2008 | Walker et al. |
| 2009/0249393 | A1 | 10/2009 | Shelton et al. |
| 2010/0003006 | A1 | 1/2010 | Tokunaka et al. |
| 2010/0281375 | A1 | 11/2010 | Pendergast et al. |
| 2010/0281376 | A1 | 11/2010 | Meaney et al. |
| 2010/0303440 | A1 | 12/2010 | Lin et al. |
| 2011/0231867 | A1 | 9/2011 | Williams et al. |
| 2012/0042251 | A1 | 2/2012 | Rodriguez et al. |
| 2012/0070129 | A1 | 3/2012 | Lin et al. |
| 2012/0079382 | A1 | 3/2012 | Swenson et al. |
| 2012/0210220 | A1 | 8/2012 | Pendergast et al. |
| 2012/0210222 | A1 | 8/2012 | Matsuda et al. |
| 2012/0210231 | A1 | 8/2012 | Ubillos et al. |
| 2012/0275770 | A1 | 11/2012 | Tsai et al. |
| 2012/0321280 | A1 | 12/2012 | Lin et al. |
| 2013/0104042 | A1 | 4/2013 | Meaney et al. |
| 2013/0163956 | A1 | 6/2013 | Medhurst |
| 2013/0257770 | A1 | 10/2013 | Tsaregorodtsev et al. |
| 2013/0302012 | A1 | 11/2013 | Angquist et al. |
| 2014/0086560 | A1 | 3/2014 | Gallo et al. |
| 2014/0270708 | A1 | 9/2014 | Girgensohn et al. |
| 2015/0040161 | A1 | 2/2015 | Haykinson et al. |
| 2015/0160834 | A1* | 6/2015 | Lee .................... G06F 3/04842 715/810 |
| 2015/0179222 | A1 | 6/2015 | Kapa, Jr. et al. |
| 2015/0346984 | A1 | 12/2015 | Flint et al. |
| 2016/0239869 | A1 | 8/2016 | Wong et al. |

* cited by examiner

IMAGE FETCHING FOR TIMELINE SCRUBBING OF DIGITAL MEDIA

CROSS-REFERENCE TO RELATED APPLICATION

This application is a divisional of and claims priority to U.S. patent application Ser. No. 14/743,955, entitled "Image Fetching for Timeline Scrubbing of Digital Media," filed Jun. 18, 2015, the entire contents of which are incorporated herein by reference.

TECHNICAL FIELD

This disclosure relates generally to scrubbing timelines of digital media.

BACKGROUND

A digital media receiver (DMR) is an electronic device that runs an application that streams digital media (e.g., music, videos, podcasts) to a personal computer, mobile device or television system. A user may access an online digital media store through the DMR to acquire videos, television shows, podcasts and other digital media. The user may also access personal data from cloud storage (e.g., photo streams). The DMR provides a graphical user interface (GUI) that allows a user to navigate digital media files with a remote control device.

SUMMARY

Disclosed are systems, methods, devices and computer-readable storage media directed to image fetching for timeline scrubbing of digital media.

In some implementations, a method comprises: receiving, by a digital media receiver at a first time prior to receiving a first scrub command, a first set of scrub images associated with digital media, the first set of scrub images having a first set of positions on a timeline of the digital media; receiving, by the digital media receiver, the first scrub command; receiving, by the digital media receiver at a second time after the first time, a second set of scrub images associated with the digital media, the second set of scrub images having a second set of positions on the timeline that fill time gaps in the first set of positions on the timeline; responsive to the first scrub command: animating, by the digital media receiver, a timeline overlay including the timeline, a playhead and a scrub image window; and selecting, by the digital media receiver, a scrub image from the first or second sets of scrub images for presentation in the scrub image window, the selecting based on a playhead position on the timeline.

In some implementations, a method comprises: receiving, by a digital media receiver, a playlist including resource identifiers to scrub images associated with a digital media; sending, by the digital media receiver, a first request to a network media server for a first set of scrub images using a first set of resource identifiers; receiving, by the digital media receiver at a first time prior to receiving a scrub command, the first set of scrub images associated with digital media, the first set of scrub images having a first set of positions on a timeline of the digital media; receiving, by the digital media receiver, a scrub command; sending, by the digital media receiver, a second request to the network media server for a second set of scrub images using a second set of resource identifiers; receiving, by the digital media receiver, the second set of scrub images associated with the digital media, the second set of scrub images having a second set of positions on the timeline that fill time gaps in the first set of positions on the timeline; responsive to the scrub command: animating, by the digital media receiver, a timeline overlay including the timeline, a playhead and a scrub image window; and selecting, by the digital media receiver, a scrub image from the first or second sets of scrub images for presentation in the scrub image window, the selecting based on a playhead position on the timeline.

Other implementations disclosed herein are directed to devices, systems and non-transitory, computer-readable storage media.

Particular implementations disclosed herein realize one or more of the following advantages. In response to a scrub command from a remote control device to scrub a digital media timeline, a scrub image window is displayed that presents scrub images according to a position of a playhead on the digital media timeline. To ensure that scrub images are available for presentation in the scrub image window, the DMR fetches multiple sets of scrub images from a network media server, in succession, during playing of the digital media, where each successive set of scrub images fetched fills time gaps in the digital media timeline left by a preceding set of images fetched. The fetching process continues until the DMR fetches and caches all available scrub images or a sufficient number of scrub images such that a minimum time gap granularity and/or timeline coverage is met.

The details of one or more implementations are set forth in the accompanying drawings and the description below. Other features, aspects, and advantages will become apparent from the description, the drawings, and the claims.

DETAILED DESCRIPTION

Exemplary System

Figure 1:
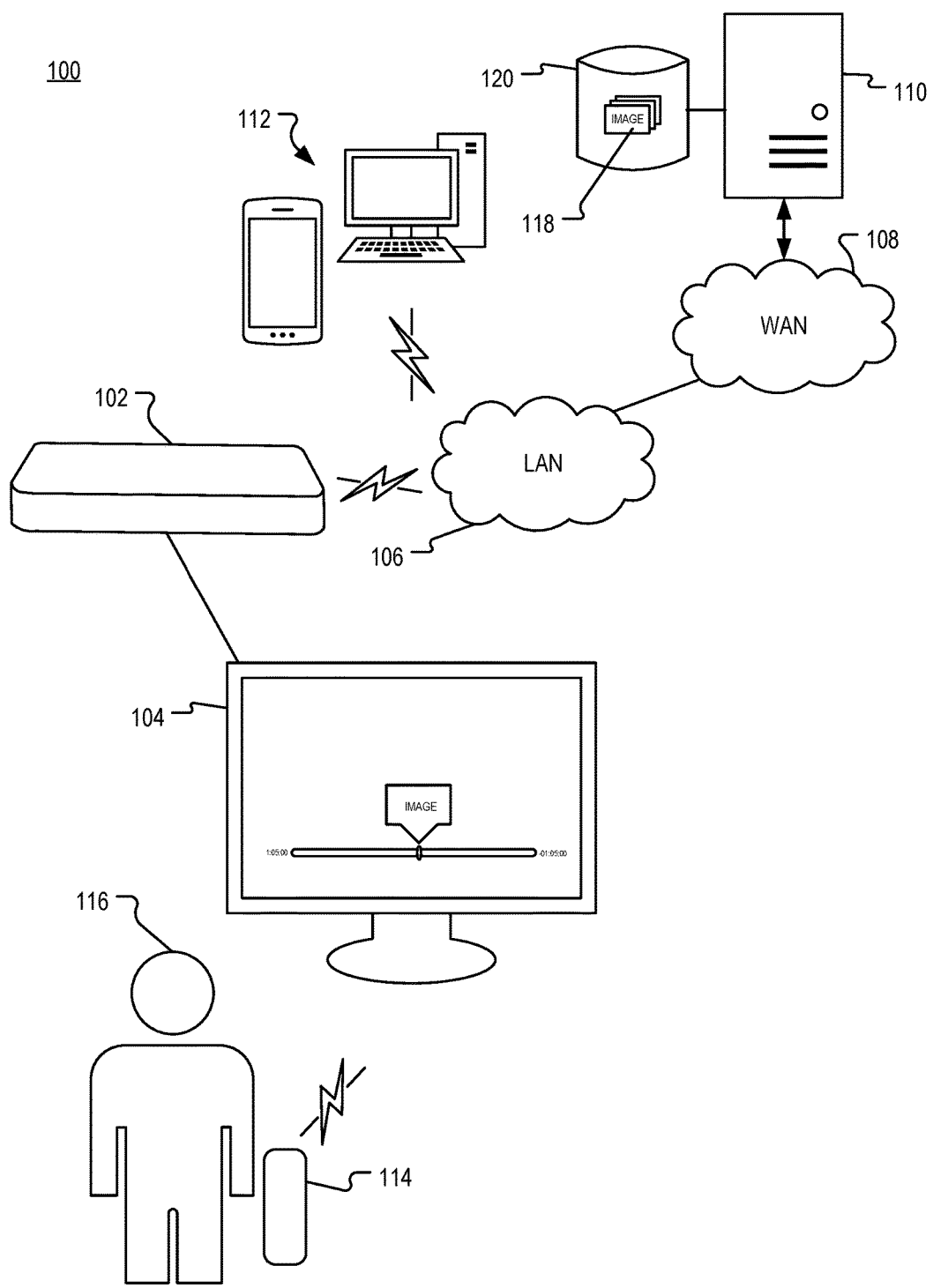
FIG. 1 is a block diagram of an example system for scrubbing a digital media timeline.

FIG. 1 is a block diagram of an example system 100 for scrubbing a digital media timeline. In some implementations, system 100 can include digital media receiver (DMR) 102, media presentation system 104 (e.g., a television system) and remote control device 114. DMR 102 can communicate with media presentation system 104 through a wired or wireless communication link. DMR 102 can couple to a local area network (LAN) 106 through, for example, a router or other access point (AP) over a wired or wireless communication link. In some implementations, LAN 106 can couple to wide area network (WAN) 108 (e.g., the Internet) through the router or AP. DMR 102 and client devices 112 can communicate with DMR 102 through LAN 106. DMR 102 and client devices 112 can also communicate with network media server 110 through WAN 108. Client devices 112 can be a personal computer, a smart phone, an electronic tablet, a wearable computer (e.g., a smart watch) or any other electronic device capable of wired or wireless communication with other devices.

In the example shown, DMR 102 is a stand-alone device. In other implementations, DMR 102 can be integrated with media presentation system 104, such as a television system or television set-top box or embedded in, or coupled to a client device (e.g., a smart phone, a laptop or a tablet computer). DMR 102 can include one or more processors, memory and one or more interfaces, as described in reference to FIG. 7. DMR 102 can include an operating system that can generate and display a GUI that allows user 116 to navigate through a local digital media library or online digital media store and search for and play digital media. Digital media can include any digital content, including but not limited to: movies, television shows, music, media presentations, photo streams and podcasts.

Remote control device 114 can communicate with DMR 102 through a wireless or wired communication link. Remote control device 114 allows user 116 to navigate the GUI presented on media presentation device 104. In some implementations, remote control device 114 can be a Bluetooth™ enabled wireless handheld remote control, a wireless or wired keyboard, a smart phone, a tablet computer or a wearable computing device (e.g., a smart watch). Remote control device 114 can have one or more hardware buttons and a control for moving the playhead backward and forward ("scrubbing") such as a scroll wheel or a touch-sensitive surface, as described in reference to FIG. 2.

Media presentation system 104 can be any display system capable of displaying digital media, including but not limited to: a high-definition television system, computer, projection device, tablet computer, smart phone, wearable device and the like.

Figure 8:
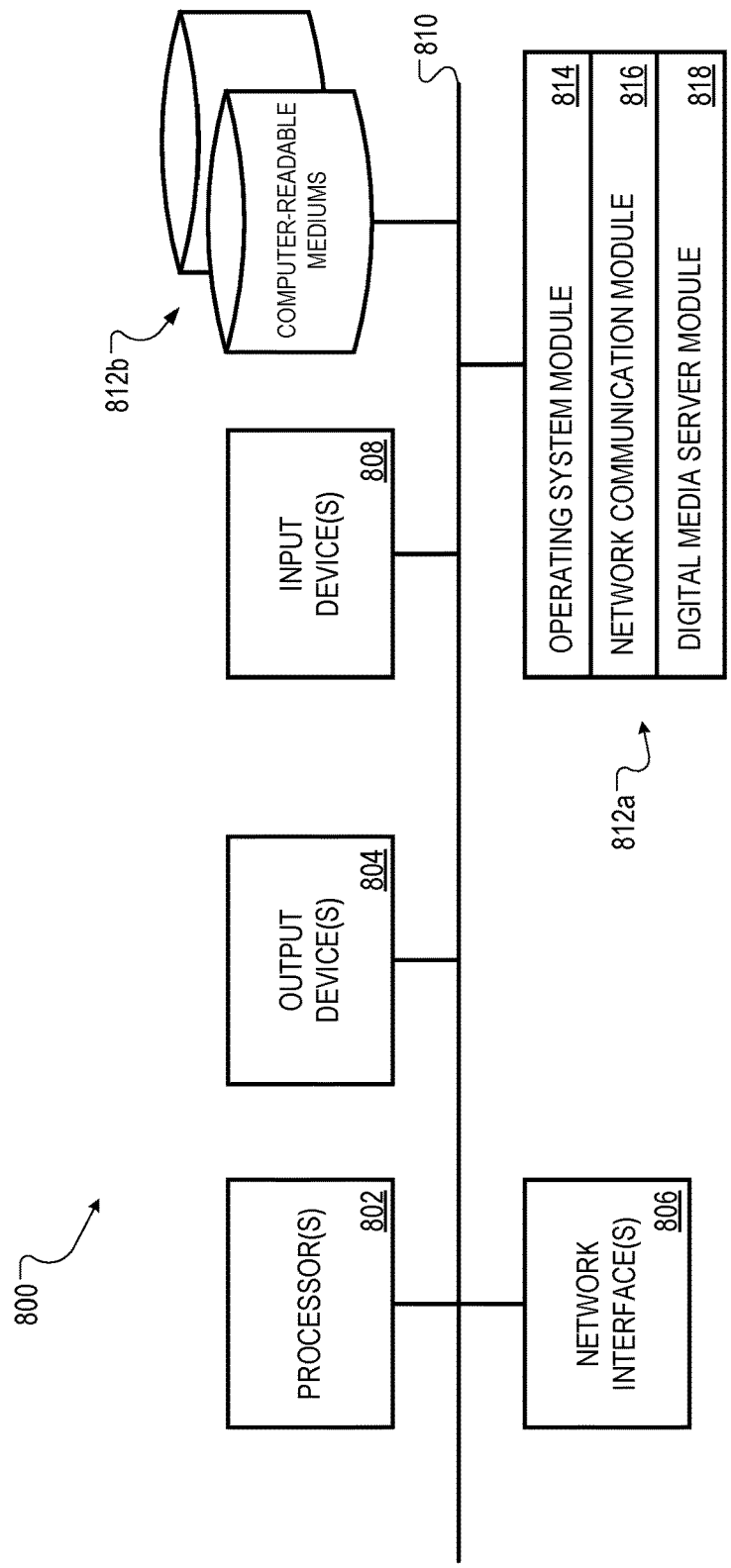
FIG. 8 is a block diagram of an example architecture of a network media server that implements the features and processes described in reference to FIGS. 1-6.

Network media server 110 can be implemented by the server architecture described in reference to FIG. 8. Network media server 110 is coupled to content database 120, which stores digital media and scrub images 118, as described in reference to FIGS. 2-6. Network media server can be operated by, for example, an online digital media store (e.g., iTunes® store) and/or a cable television operator.

Figure 2:
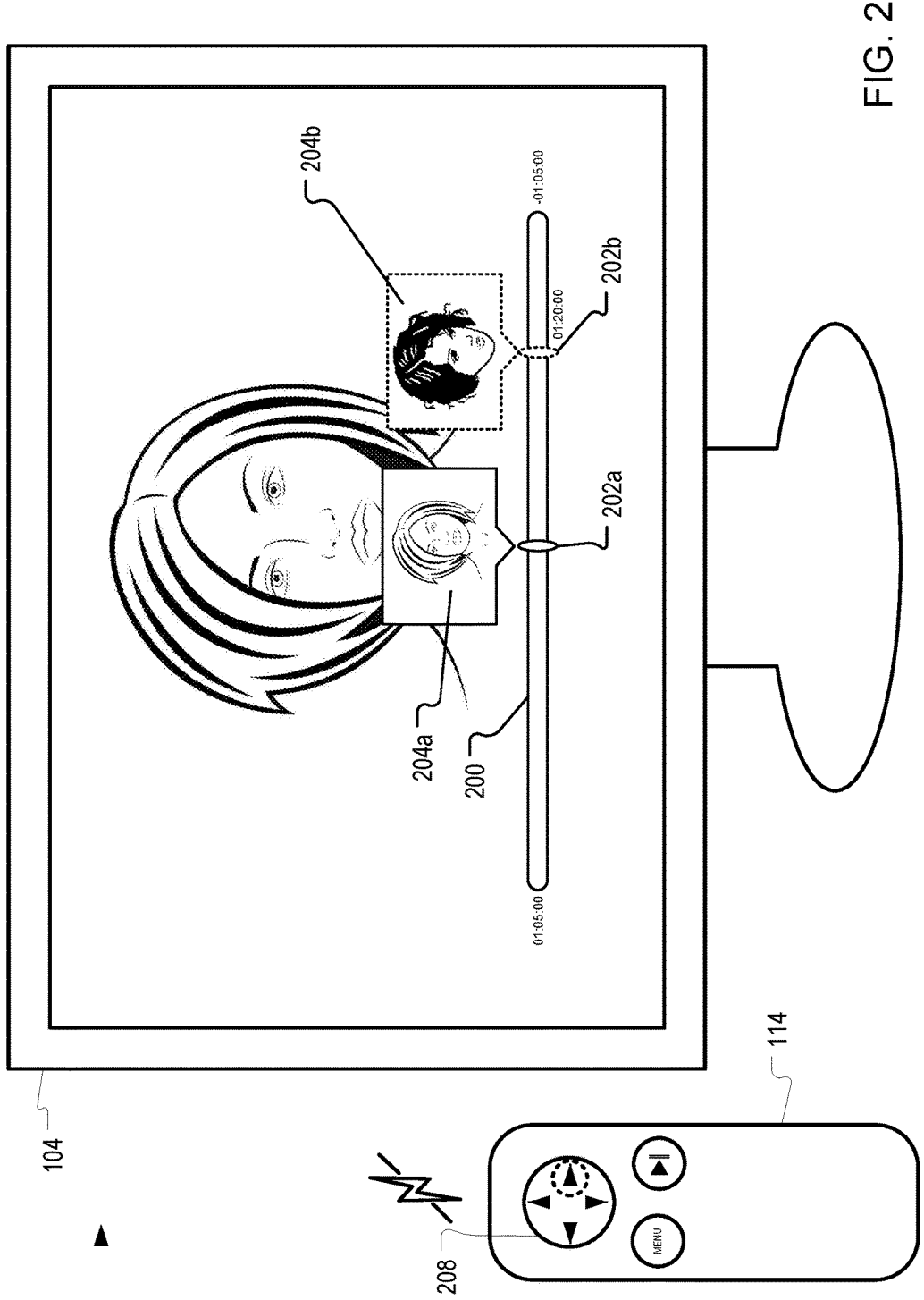
FIG. 2 illustrates scrubbing a digital media timeline.

FIG. 2 illustrates scrubbing a digital media timeline. In the example shown, user 116 paused a video that was playing on media presentation system 104 using remote control device 114. A video frame corresponding to the position of playhead 202a in digital media timeline 200 is displayed by media presentation system 104 (e.g., a television screen). Above playhead 202a, scrub image window 204a is displayed. Scrub image window 204a presents a scrub image that can be, for example, a thumbnail image (e.g., a lower resolution image) of the video frame displayed by media presentation system 104.

While the digital media (e.g., video) is paused (e.g., by the user pressing a "pause" button on remote control device 114), user 116 operates control 208 of remote control device 114 to generate a scrub command to scrub timeline 200 (e.g., by pressing a forward or backward button or making a swipe gesture on a touch sensitive surface). Responsive to the scrub command, playhead 202a moves from its current time position to a new time position at 01:20:00 in timeline 200 (indicated by playhead 202b). At the new time position, a scrub image is presented in scrub image window 204b. The new scrub image corresponds to the new position of playhead 202b on timeline 200. The new scrub image may or may not correspond with the position of playhead 202b on timeline 200, but rather can be a scrub image that is closest in time with the position of playhead 202b and that has been cached in DMR 102 using the process described in reference to FIGS. 3 and 5.

Figure 3:
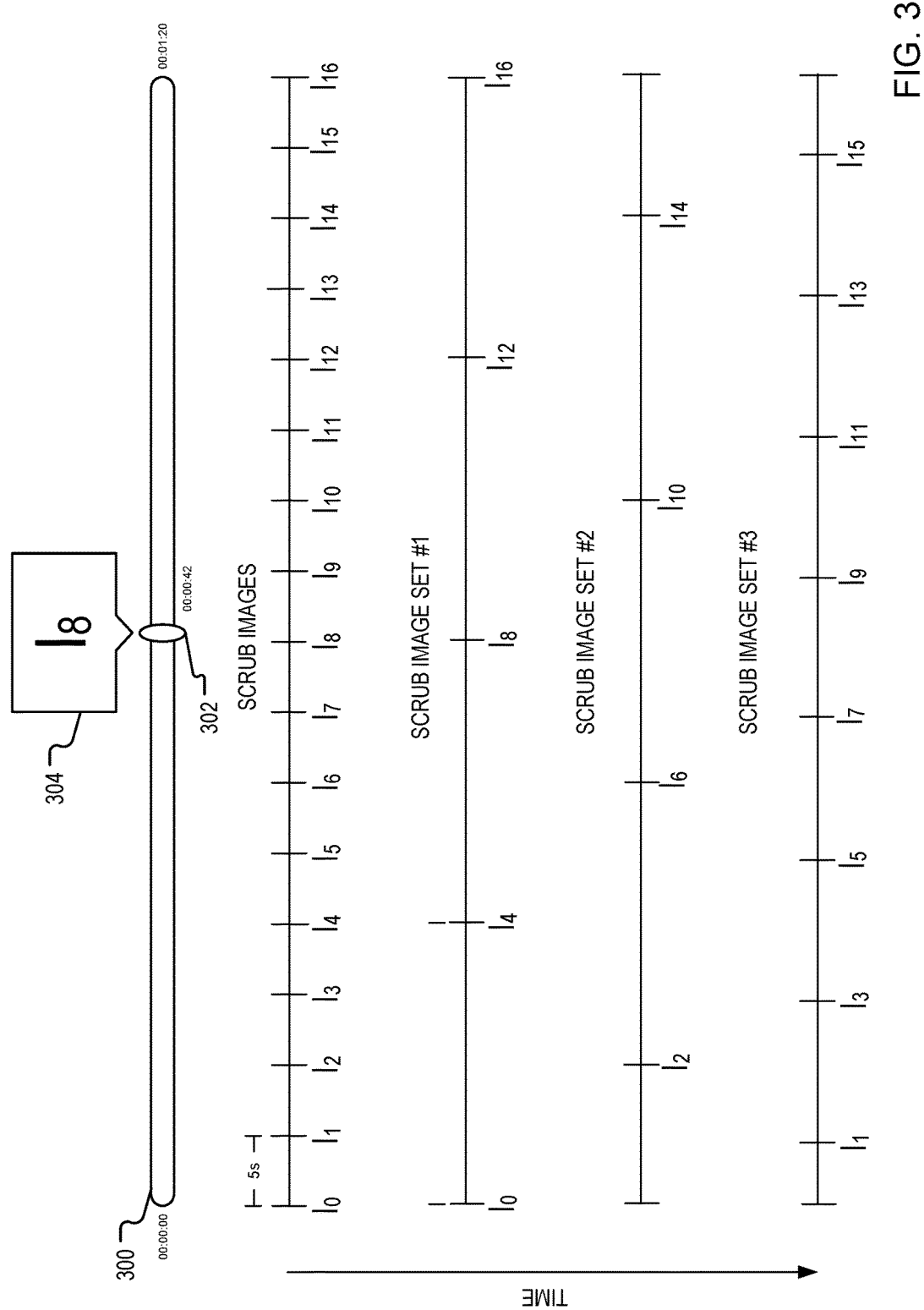
FIG. 3 is a diagram illustrating fetching of scrub images.

FIG. 3 is a diagram illustrating fetching of scrub images. In some implementations, scrub images 118 are stored in content database 120, as shown in FIG. 1. In practice, a content provider (e.g., a video distributor or publisher) may not allow full frame, high definition video frames to be downloaded to client devices. The content provider, however, will often provide low-resolution thumbnail images (e.g., JPEG images) that can be accessed by a client device through network media server 110. These scrub images can be digital media frames spaced apart in time, which are hereinafter referred to as time gaps. For example, a scrub image may be available for every 5 seconds of video time. Because of network bandwidth, it could take as long as 5 minutes to fetch a full set of scrub images for a two-hour video. Because remote control device 114 allows user 116 to scrub any portion of timeline 200, if the scrub images are not locally cached for the portion scrubbed, there will not be any scrub images available to present in scrub image window 204.

To ensure that scrub images are available for presentation in scrub image window 204, DMR 102 fetches and caches multiple sets of scrub images from network media server 110, in succession, during playing of digital media, where each successive set of scrub images fetched fills time gaps in the digital media timeline left by a preceding set of images fetched. The fetching process continues until the DMR fetches and caches all available scrub images or a sufficient number of scrub images such that a minimum time gap granularity and/or timeline coverage is met. For a two-hour video, it could take as long as 5 minutes to fetch all the scrub images over WAN 108, assuming the scrub images are spaced apart by 5 seconds on the digital media timeline. This fetch process is illustrated in FIG. 3 for a 1 minute, 20 second video clip where 16 scrub images $I_1$-$I_{16}$ are available for download from network media server 110.

At a first wall clock time and prior to receiving a first scrub command, a first set of images $S_1=\{I_0, I_4, I_8, I_{12}, I_{16}\}$ is fetched and cached by DMR 102, as illustrated in FIG. 3. At a second wall clock time after the first wall clock time and after receiving the first scrub command, a second set of images $S_2=\{I_2, I_6, I_{10}, I_{14}\}$ is fetched and cached by DMR 102. At a third wall clock time after the second wall clock time, a third set of images $S_3=\{I_1, I_3, I_5, I_7, I_9, I_{11}, I_{13}, I_{15}\}$ is fetched and cached by DMR 102. In this example, all of the scrub images accessible through network media server 110 have been fetched and cached by DMR 102 and the process terminates. The second and third sets of images can be downloaded opportunistically, such as when the user pauses the media stream.

With the scrub images cached, if user 116 scrubs anywhere along timeline 300 for the video clip (an 80 second timeline), the cached scrub image that is closest to the position of playhead 302 on timeline 300 is presented in scrub image window 304. For example, if the position of playhead 302 is 42 seconds into the video clip, scrub image $I_8$ will be presented in scrub image window 304 because scrub image $I_8$ is closest in timeline 300 to the video frame at 42 seconds. Using this fetch process, there will always be a scrub image available to display in scrub image window 204, which provides an improved viewing experience for user 116. In the event there are two scrub images that are equidistant in time from the position of playhead 302 in timeline 300, the image to the immediate right of playhead 302 can be selected as a default. In some implementations, other criteria can be used to select one of two possible scrub images to display.

Figure 4:
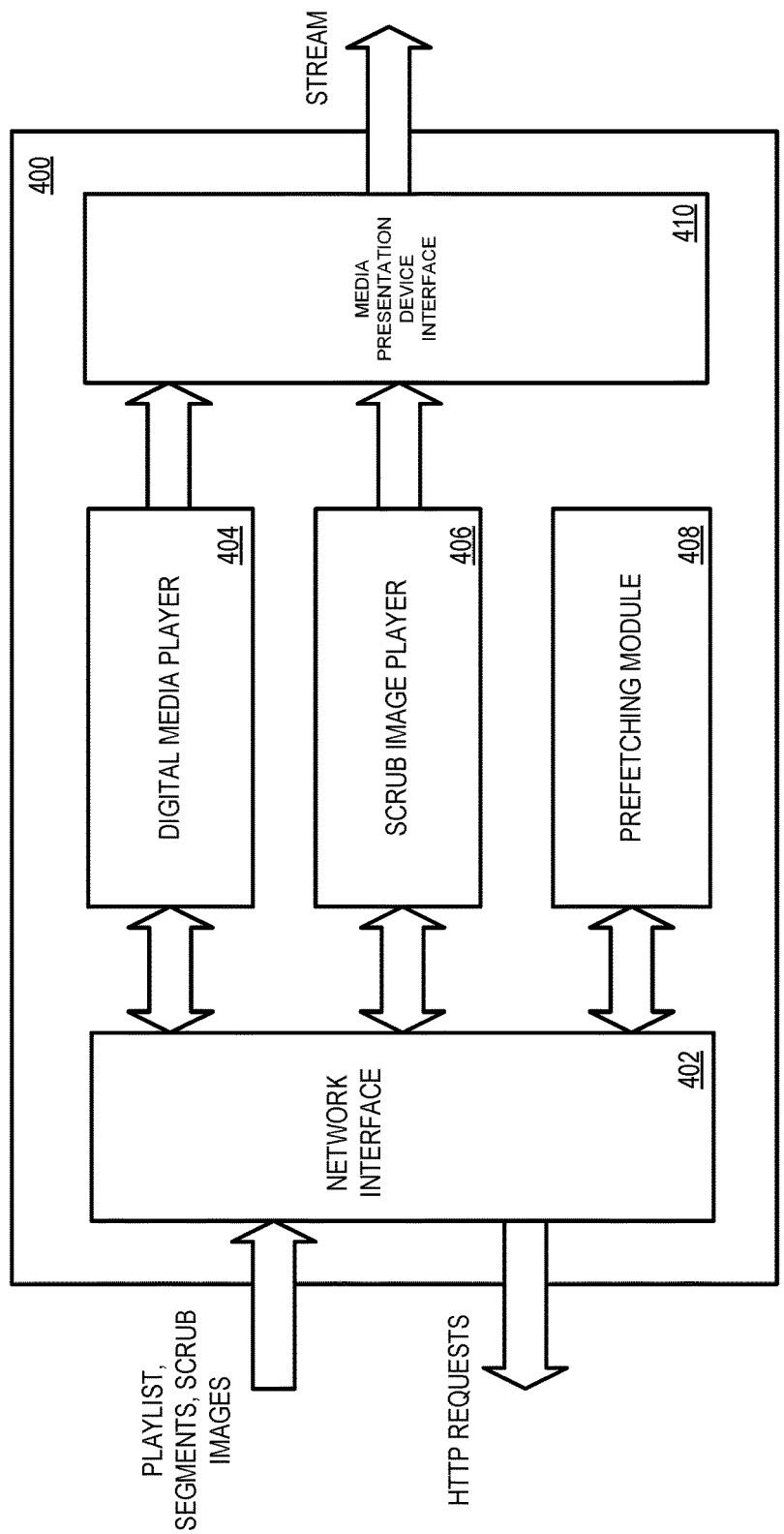
FIG. 4 is a block diagram illustrating a system for timeline scrubbing of digital media that is received by the DMR using adaptive bit rate streaming.

FIG. 4 is a block diagram illustrating system 400 for timeline scrubbing of digital media that is received by the DMR using adaptive bit rate streaming. System 400 can be implemented in software and/or hardware by DMR 102. In some implementations, system 400 can include network interface 402, digital media player 404, scrub image player 406, pre-fetching module 408 and media presentation device interface 410.

In some implementations, system 400 can receive packets including segments (chunks) of digital media stream from network media server 110 according to an adaptive bit rate streaming protocol. For example, network media server 110 can be a hypertext transport protocol (HTTP) live streaming (HLS) server or an MPEG-DASH server. Network media server 110 can generate a playlist (or manifest) that includes an ordered list of resource identifiers (resource ID) for accessing and retrieving segments (chunks) of a digital media. In some implementations, a resource identifier can be a universal resource identifier (URI). In some implementations, the playlist/manifest can also include an ordered list of resource identifiers for accessing and retrieving scrub images. In some implementations, the playlist/manifest can include a resource identifier that points to another location where a list of resource identifiers for the segments and/or scrub images can be accessed and retrieved. In some implementations, the resource identifier pointing to the list of segments and/or scrub images can be a uniform resource locator (URL). In some implementations, the segments and scrub images can be transferred with different bit rates depending on, for example, network bandwidth using known adaptive bit rate streaming protocols.

The playlists/manifests, segments and scrub images are requested and received by network interface 402. Network interface 402 can include program code for implementing one or more protocol stacks (e.g., TCP/IP) and transport streams/container formats (e.g., User Datagram Protocol (UDP), MPEG Transport Stream (MTS)). In some implementations, multiple scrub images can be fetched with parallel requests by opening multiple HTTP requests in parallel.

Digital media player 404 is configured to receive and decode segments and send the decoded segments to media presentation device interface 410, which formats the segments into a digital media stream that can be received by a media presentation device (e.g., a television system, computer, mobile device) that is coupled to interface 410.

Scrub image player 406 is configured to receive and decode/decrypt (if necessary) scrub images from interface 402 and send the decoded/decrypted scrub images to interface 410 for playback in a stream on a media presentation device during timeline scrubbing, as described in reference to FIG. 2.

Pre-fetching module 408 is configured to pre-fetch scrub images from network media server 110 using a multi-pass process. In a first pass through the playlist/manifest, pre-fetching module 408 selects a first set of URIs, and then fetches and caches a first set of scrub images identified by the URIs. In a second pass through the playlist/manifest, pre-fetching module 408 selects a second set of URIs, and then fetches and caches a second set of scrub images identified by those URIs. This pre-fetching process can continue until all of the scrub images listed in the playlist/manifest have been fetched and cached or some desired number of scrub images have been cached or any other desired termination criteria.

It is preferable that the scrub images be spaced apart such that the entire timeline of the digital media is covered by scrub images. In some implementations, the scrub images can be frames that are taken directly from the digital media every n seconds on the digital media timeline. Subsequent sets of scrub images can be frames that are taken directly from the digital media file every m seconds, where m<n. The variables m and n can be selected to be a set of co-prime numbers to reduce the possibility that duplicate images are fetched. For example, a first set of scrub images fetched can be 59 seconds apart on the digital media timeline, a second set of scrub images fetched can be 31 seconds apart, and a third set of scrub images fetched can be 15 seconds apart. In this example, 59, 31 and 15 are a set of co-prime numbers.

Exemplary Processes

Figure 5:
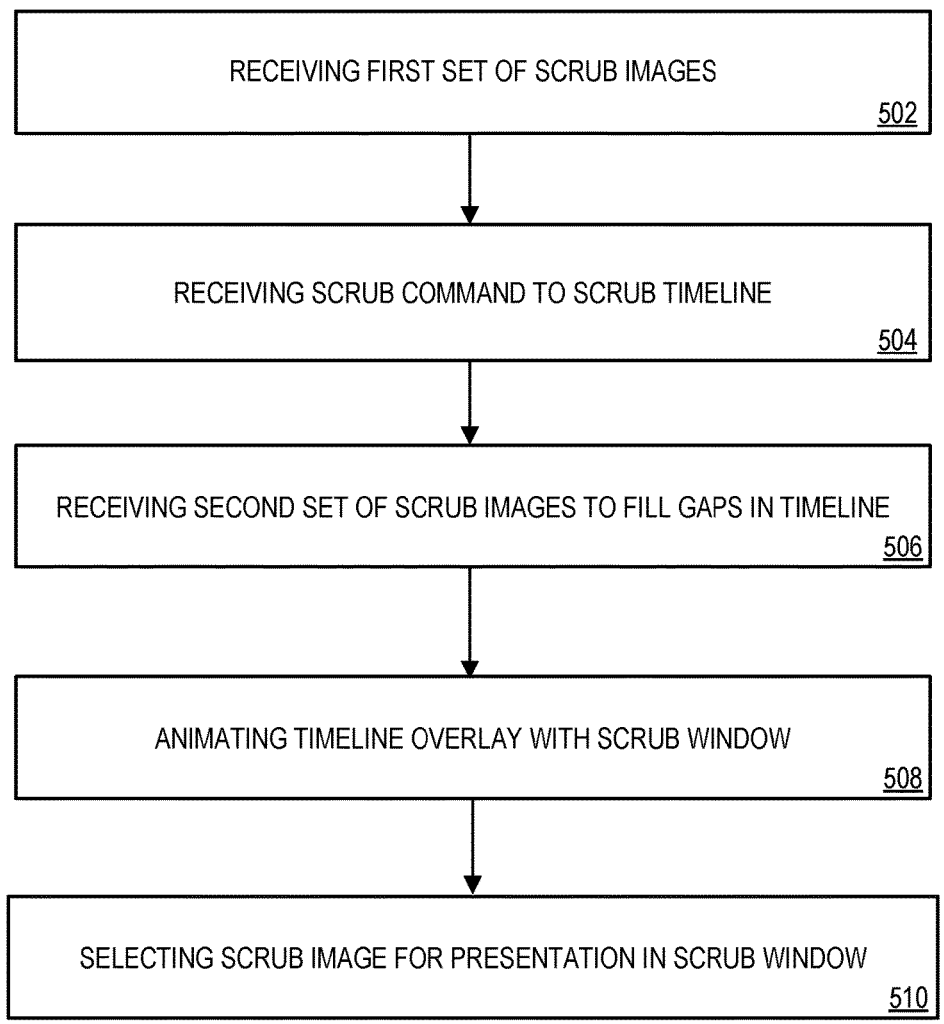
FIG. 5 is a flow diagram of an example process of fetching images for timeline scrubbing of digital media.

FIG. 5 is a flow diagram of an example process 500 of fetching images for timeline scrubbing. All or part of process 500 may be implemented by, for example, DMR architecture 700, as described in reference to FIG. 7. Process 500 may be one or more processing threads running on one or more processors or processing cores. Portions of process 500 may be performed on more than one device.

Process 500 can begin by receiving, at a first wall clock time, a first set of scrub images associated with digital media, the first set of scrub images having a first set of positions on a timeline of the digital media (502). For example, a content provider, distributor or the like can generate a number of low-resolution thumbnail images (e.g., JPEG images) of frames of digital media (e.g., a video). The digital media file can be streamed on-demand from one or more network media servers or can be a live broadcast. Each of the scrub images can be time stamped so that they can be associated with a digital media timeline, which is a timeline that can be coextensive with the duration of the digital media. In some cases, the timestamp can be an offset time from the beginning of the digital media file. The scrub images can be separated by time gaps (e.g., 5 seconds) on the digital media timeline. In some implementations, the scrub images can be key frames of the digital media that include sufficient detail to allow a user to recognize a scene of the digital media file. In some implementations, the first set of images can be fetched from the network media server automatically (e.g., as a background process transparent to the user) when the user first starts playing the digital media and prior to receiving a first scrub command. The scrub images can be cached in memory (e.g., flash, hard disk) of the digital media receiver. Receiving a first set of scrub images when the user first starts playing the digital media and before the user initiates a first scrub command ensures that there are at least some scrub images available for display in the scrub image window should the user initiate a scrub command at any time during the playing of the digital media.

The scrub images can be transported from the network media server to a digital media receiver using a known digital media transport protocol (e.g., Real-time Transport Protocol (RTP), MTS, UDP).

Process 500 can continue by receiving a first scrub command to scrub the digital media timeline (504) and then receiving, at a second wall clock time, a second set of scrub images to fill gaps in the digital media timeline (506), as described in reference to FIG. 3. In some implementations, the scrub command can be received from a remote control device, as described in reference to FIG. 2. The second set of scrub images can be automatically (e.g., opportunistically) fetched from the network media server after the first set of scrub images is received prior to receiving the first scrub command, and then cached on the digital media receiver with the first set of images. For example, the second set of scrub images can be downloaded whenever the user pauses the digital media. Additional sets of images can be fetched and cached as described above until all the scrub images have been fetched and cached by the digital media receiver or some desired number of scrub images have been cached that preferably span the entire duration of the digital media file. In some implementations, the selection of additional sets of scrub images can be based at least in part on the direction of scrubbing (e.g., backward or forward) or the portion of the timeline that is being scrubbed. For example, the scrub image sets can be associated with different portions of the timeline, and the direction of scrubbing can be used to predict which scrub image set to download from among a plurality of scrub image sets waiting to be downloaded.

Process 500 can continue by animating a timeline overlay including the digital media timeline, a playhead and a scrub image window (508).

In some implementations, the time overlay can be an animated video overlay that is superimposed or composited on top of the digital media using known animation techniques and may include transport controls to allow the user to play, pause, shuttle forward and backward in time and fast forward. In some implementations, the playhead is animated to traverse the timeline in response to scrub commands from a remote control device, as described in reference to FIG. 2.

Process 500 can continue by selecting a scrub image from the first or second sets of scrub images for presentation in the scrub image window, the selecting based on a playhead position on the timeline (510). For example, the scrub image with a timestamp that is closest to the time position of the playhead on the digital media timeline is presented in the scrub image window during time scrubbing, as described in reference to FIG. 2.

Figure 6:
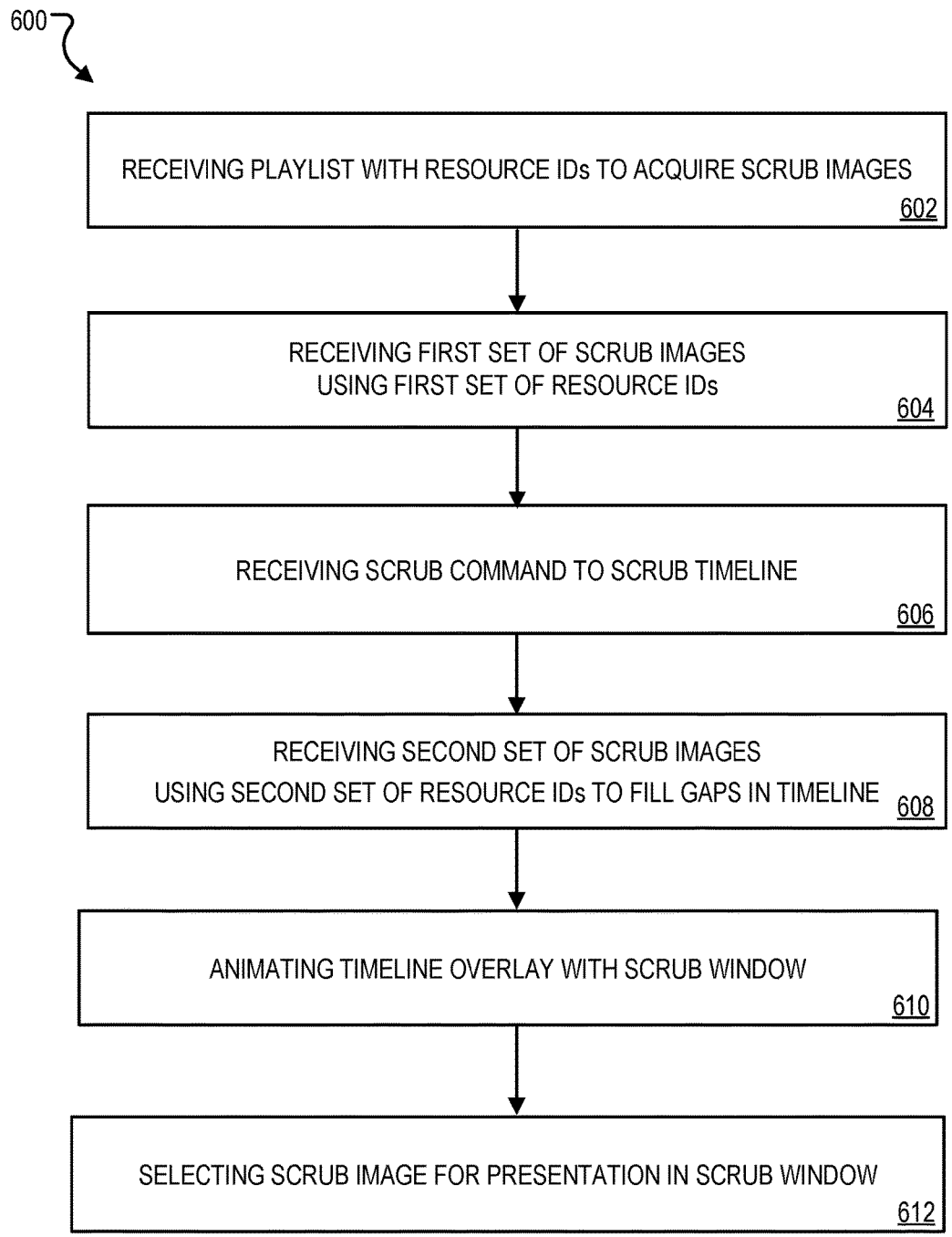
FIG. 6 is a flow diagram of an example alternate process of fetching images for timeline scrubbing of digital media using adaptive bit rate streaming.

FIG. 6 is a flow diagram of an example alternate process 600 of fetching images for timeline scrubbing of digital media using adaptive bit rate streaming. All or part of process 600 may be implemented in, for example, DMR architecture 700, as described in reference to FIG. 7. Process 600 may be one or more processing threads running on one or more processors or processing cores. Portions of process 600 may be performed on more than one device.

Process 600 can begin by receiving a playlist (or manifest) including resource identifiers for accessing and retrieving scrub images associated with digital media (602). In some implementations, the DMR is configured to comply with adaptive bit rate streaming protocols, such as HLS, MPEG-DASH and the like. For example, an HTTP server can generate and send a playlist/manifest to the DMR when the digital media first starts playing on a media presentation device. The playlist/manifest can include a first ordered list of resource identifiers (e.g., URIs) for fetching segments of the digital media file, according to the adaptive bit rate streaming protocol specifications. Additionally, a second ordered list of resource identifiers (e.g., URIs) can be included in the playlist/manifest for fetching scrub images of the digital media file.

In some implementations, the playlist/manifest does not include resource identifiers to segments and/or scrub images, but rather includes a resource identifier (e.g., a URL) pointing to another list of resource identifiers for segments and/or scrub images. In some implementations, the resource identifiers can point to different versions of the segments and/or scrub images to accommodate different bit rates. In some cases, the scrub images can have different resolutions that can represent different camera angles.

Process 600 can continue by receiving a first set of scrub images (604). The DMR can make a first request to a network media server for a first set of scrub images using a first set of resource identifiers selected from the playlist/manifest. For example, multiple serial or parallel HTTP requests can be made with a first set of URIs to access and fetch a first set of scrub images.

Process 600 can continue by receiving a command to scrub the digital media timeline (606) and then receiving (e.g., opportunistically) a second set of scrub images to fill gaps in the digital media timeline (608), as described in reference to FIG. 3. The DMR can make a second request to a network media server for a second set of scrub images using a second set of resource identifiers selected from the playlist/manifest. For example, multiple serial or parallel HTTP requests can be made with a second set of URIs to access and fetch a second set of scrub images.

Process 600 can continue by animating, in response to the command, a timeline overlay including the digital media timeline, a playhead and a scrub image window (610). In some implementations, the time overlay can be an animated video overlay that is superimposed or composited on top of the digital media using known animation techniques and may include transport controls to allow the user to play, pause, shuttle forward and backward in time and fast forward. In some implementations, the playhead is animated to traverse the timeline during scrubbing in response to scrub commands from a remote control device, as described in reference to FIG. 2.

Process 600 can continue by selecting a scrub image from the first or second sets of scrub images for presentation in the scrub image window, the selecting based on a playhead position on the timeline (612). For example, the scrub image with a timestamp that is closest to the time position of the playhead on the timeline is presented in the scrub image window during time scrubbing, as described in reference to FIG. 2.

Example DMR Architecture

Figure 7:
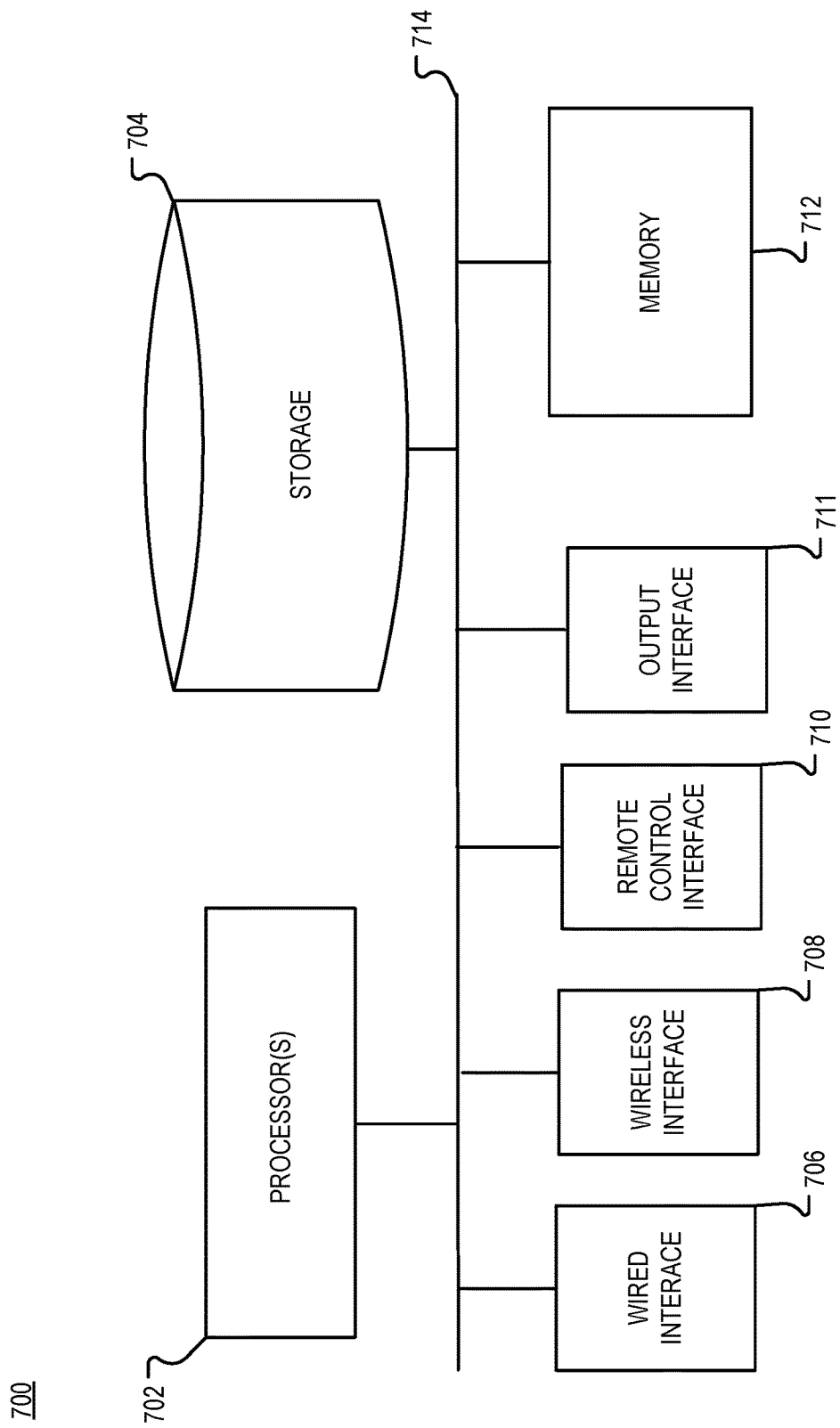
FIG. 7 is a block diagram of an example architecture of a DMR that implements the features and processes described in reference to FIGS. 1-6.

FIG. 7 is a block diagram of an example architecture of a DMR architecture 700 that implements the features and processes described in reference to FIGS. 1-6. DMR architecture 700 may generally include processor(s) and/or processor core(s) 702, computer-readable medium(s) (e.g., non-volatile storage device 704, volatile memory 712), wired network interface 706, wireless network interface 708, remote control device interface 710 and output interface 711. Each of these components may communicate with one or more other components over communication channel 714, which may be, for example, a computer system bus including a memory address bus, data bus, and control bus.

In some implementations, processor(s)/processor core(s) 702 may be configured to control the operation of DMR 102 by executing one or more instructions stored in computer-readable media 704, 712. For example, storage device 704 may be configured to store media content (e.g., video segments, scrub images), metadata (e.g., context information, content information), configuration data, user preferences and operating system instructions. Storage device 704 may be any type of non-volatile storage, including a hard disk device or a solid-state drive (e.g., flash drive). Storage device 704 may also store program code for one or more applications configured to present media content on a media presentation device (e.g., a television). Storage device 704 can store program code for implementing system 400, as described in reference to FIG. 4, such as protocol stack (s). Some examples of programs include one or more media players (digital media player 404, scrub image player 406), a presentation application for presenting a slide show (e.g. music and photographs), etc. Storage device 704 may also store program code for animating a timeline overlay in response to scrubbing command from a remote control device, as described in reference to FIGS. 1-6.

Wired network interface 706 (e.g., Ethernet port) and wireless network interface 708 (e.g., IEEE 802.11x compatible wireless transceiver) each may be configured to permit DMR 102 to transmit and receive information over a network, such as a local area network (LAN), wireless local area network (WLAN) or WAN (e.g., the Internet). Wireless network interface 708 may also be configured to permit direct peer-to-peer communication with other client devices 112, such as an electronic tablet or other mobile device (e.g., a smart phone).

Output interface 711 may be configured to couple DMR 102 to one or more external devices, including a television system, a monitor, an audio receiver, and one or more speakers. For example, output interface 711 may include one or more of an optical audio interface, an RCA connector interface, a component video interface, and a High-Definition Multimedia Interface (HDMI). Output interface 711 also may be configured to provide one signal, such as an audio stream, to a first device and another signal, such as a video stream, to a second device. Memory 712 may include non-volatile memory (e.g., ROM, flash) for storing configuration or settings data, operating system instructions, flags, counters, etc. In some implementations, memory 712 may include random access memory (RAM), which may be used to store digital media received in DMR 102, such as during playback or pause. RAM may also store content information (e.g., metadata, scrub images) and context information.

DMR architecture 700 may include remote control device interface 710 that may be configured to receive commands from one or more wireless remote control devices (e.g., device 114, keyboard). Remote control device interface 710 may receive the commands through a wireless connection, such as infrared or radio frequency signals (e.g., Bluetooth enabled device). The received commands may be utilized, such as by processor(s) 702, to control media playback or to configure DMR 102.

FIG. 8 is a block diagram of an example architecture 800 of a network media server that implements the features and processes described in reference to FIGS. 1-6. Other architectures are possible, including architectures with more or fewer components. In some implementations, architecture 800 includes processor(s) 802 (e.g., dual-core Intel® Xeon® Processors), output device(s) 804 (e.g., LCD), network interface(s) 806, input device(s) 808 (e.g., mouse, keyboard, touch-sensitive display), non-transitory, computer-readable medium(s) 812b and memory 812a (e.g., RAM, ROM, SDRAM, hard disk, optical disk, flash memory, etc.). These components can exchange communications and data over one or more communication channels 810 (e.g., buses), which can utilize various hardware and software for facilitating the transfer of data and control signals between components.

The term "non-transitory computer-readable medium" refers to any medium that participates in providing instructions to processor 802 for execution, including without limitation, non-volatile media (e.g., optical or magnetic disks) and volatile media (e.g., memory).

Computer-readable media 812b or memory 812a can further include operating system 814 (e.g., Mac OS® server, Windows® NT server), network communication module 816 and digital media server module 818. Operating system 814 can be multi-user, multiprocessing, multitasking, multithreading, real time, etc. Operating system 814 performs basic tasks, including but not limited to: recognizing input from input devices 808 and providing output-to-output devices 804; managing files and directories on storage devices 812b and memory 812a; controlling peripheral devices; and managing traffic on the one or more communication channels 810. Network communications module 816 includes various components for establishing and maintaining network connections (e.g., software for implementing communication protocols, such as TCP/IP, HTTP, UDP, MTS, RTP). Digital media server module 818 manages access and serves digital media and scrub images to client devices, as described in reference to FIGS. 1-6.

Architecture 800 can be included in any computer device, including one or more server computers each having one or more processing cores. Architecture 800 can be implemented in a parallel processing or peer-to-peer infrastructure or on a single device with one or more processors. Software can include multiple software components or can be a single body of code.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the author. The computer can include a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

A number of implementations have been described. Nevertheless, it will be understood that various modifications may be made. Elements of one or more implementations may be combined, deleted, modified, or supplemented to form further implementations. As another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A digital media receiver comprising:
a first interface configured to couple to a network;
a second interface configured to couple to a remote control device;
one or more processors;
memory coupled to the one or more processors and storing instructions, which, when executed by the one or more processors, causes the one or more processors to perform operations comprising:
receiving, by a digital media receiver, a playlist including resource identifiers to scrub images associated with a digital media;
sending, by the digital media receiver, a first request to a network media server for a first set of scrub images using a first set of resource identifiers;
receiving, by the digital media receiver at a first time prior to receiving a scrub command, the first set of scrub images associated with digital media, the first set of scrub images having a first set of positions on a timeline of the digital media;
receiving, by the digital media receiver, a scrub command;
sending, by the digital media receiver, a second request to the network media server for a second set of scrub images using a second set of resource identifiers;
receiving, by the digital media receiver, the second set of scrub images associated with the digital media, the second set of scrub images having a second set of positions on the timeline that fill time gaps in the first set of positions on the timeline;
responsive to the scrub command:
animating, by the digital media receiver, a timeline overlay including the timeline, a playhead and a scrub image window; and
selecting, by the digital media receiver, a scrub image from the first or second sets of scrub images for presentation in the scrub image window, the selecting based on a playhead position on the timeline.

2. The digital media receiver of claim 1, wherein the digital media is a sequence of video frames and the first and second sets of scrub images represent individual frames of the sequence of video frames.

3. The digital media receiver of claim 1, wherein the first and second sets of scrub images are received while the digital media is playing on a media presentation device coupled to the digital media receiver.

4. The digital media receiver of claim 1, wherein the timeline overlay is animated to move the scrub image window with the playhead in response to scrubbing.

5. The digital media receiver of claim 4, wherein selecting a scrub image from the first or second sets of scrub images for presentation in the scrub image window further comprises:
    selecting a scrub image having a position on the timeline that is closest to the playhead position on the timeline.

6. A method comprising:
    receiving, by a digital media receiver, a playlist including resource identifiers to scrub images associated with a digital media;
    sending, by the digital media receiver, a first request to a network media server for a first set of scrub images using a first set of resource identifiers;
    receiving, by the digital media receiver at a first time prior to receiving a scrub command, the first set of scrub images associated with digital media, the first set of scrub images having a first set of positions on a timeline of the digital media;
    receiving, by the digital media receiver, a scrub command;
    sending, by the digital media receiver, a second request to the network media server for a second set of scrub images using a second set of resource identifiers;
    receiving, by the digital media receiver, the second set of scrub images associated with the digital media, the second set of scrub images having a second set of positions on the timeline that fill time gaps in the first set of positions on the timeline; and
    selecting, by the digital media receiver, a scrub image from the first or second sets of scrub images for presentation in a scrub image window, the selecting based on a playhead position on the timeline.

7. The method of claim 6, wherein the digital media is a sequence of video frames and the first and second sets of scrub images represent individual frames of the sequence of video frames.

8. The method of claim 6, wherein the first and second sets of scrub images are received while the digital media is playing on a media presentation device coupled to the digital media receiver.

9. The method of claim 6, further comprising animating, by the digital media receiver, a timeline overlay including the timeline, a playhead and the scrub image window in response to a scrubbing command.

10. The method of claim 6, wherein selecting a scrub image from the first or second sets of scrub images for presentation in the scrub image window further comprises:
    selecting, by the digital media receiver, a scrub image having a position on the timeline that is closest to a playhead position on the timeline.

* * * * *